Feb. 25, 1964  J. DOLEMAN  3,122,427
FLUIDISED BED FOR HEAT TREATMENT OF WEB MATERIAL
Filed Feb. 24, 1961
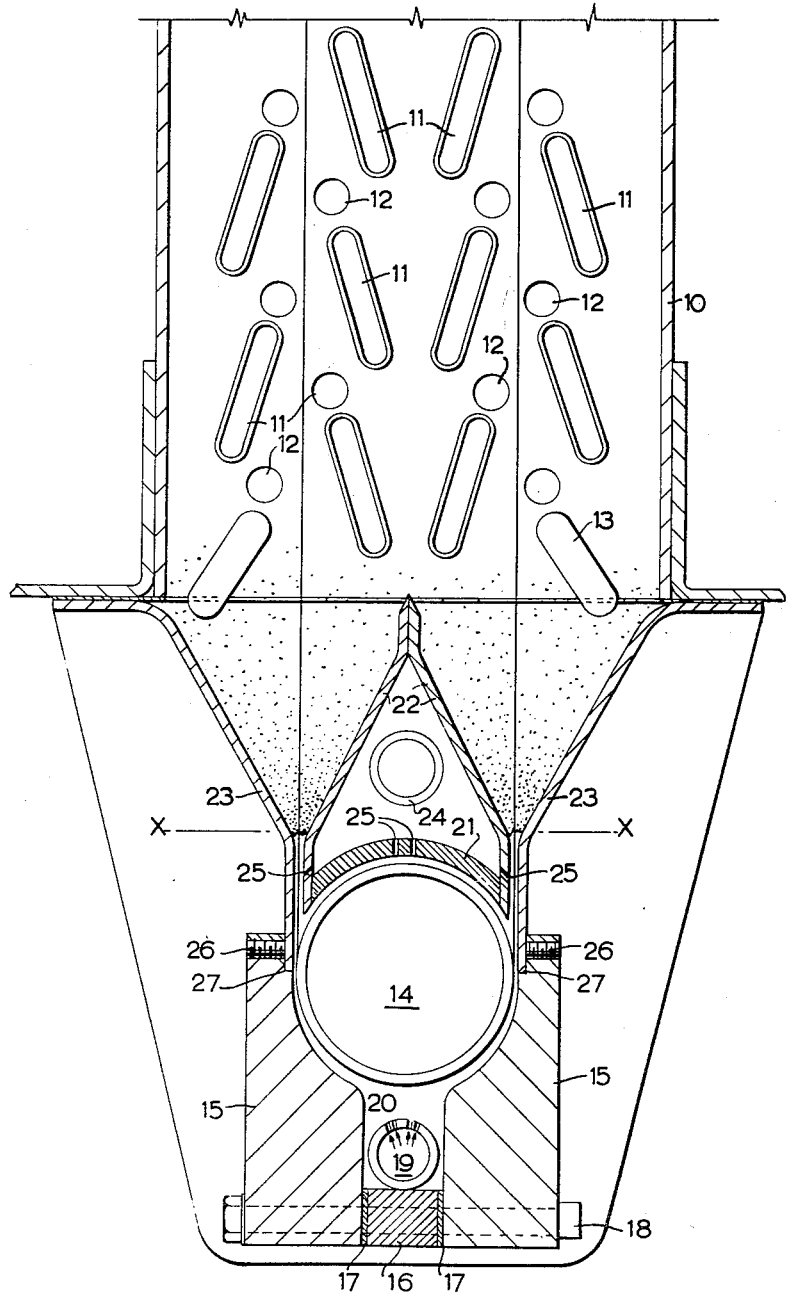
INVENTOR:
JACK DOLEMAN
BY
Frederick Breitenfeld
ATTORNEY

United States Patent Office 3,122,427
Patented Feb. 25, 1964

3,122,427
FLUIDISED BED FOR HEAT TREATMENT
OF WEB MATERIAL
Jack Doleman, Cheadle Hulme, England, assignor, by mesne assignments, to The Cotton Silk and Man-Made Fibres Research Association
Filed Feb. 24, 1961, Ser. No. 91,403
Claims priority, application Great Britain Feb. 26, 1960
4 Claims. (Cl. 34—95)

This invention concerns fluidised beds, and in particular a multi-pass fluidised bed, and methods of treating, especially heat-treating materials therein.

In this specification the term "multi-pass fluidised bed" means a fluidised bed in which material enters and leaves the bed at the upper end thereof and thus is passed at least twice through the bed, once or more in a downward direction and once or more in an upward direction. By a "double-pass fluidised bed" is meant a multi-pass fluidised bed in which the material passes twice only through the bed, once downwardly and once upwardly.

The term "material" is used herein and in the claiming clauses hereof in relation to sheet materials whether in the unwoven, or woven, knitted or likewise fabricated form, for example, netted and in relation to a multiplicity of filaments, fibres or threads arranged in sheet form.

A "fluidised bed" is a bed of solid discrete particles subjected to an upward gaseous current the size and weight of the particles and the velocity and nature of the current and the disposition of the material under treatment being so chosen that the forces exerted by the current on the particles are sufficient to counterbalance the gravitational force on free particles and to expand the bed thus allowing movement of the particles but is insufficient to convert the whole bed into a uni-directional stream of particles. The said movements of the particles in the bed may be random or may include those analogous to convection or circulatory flow in a liquid, that is to say, localised upward movement of particles may occur in a zone or zones of the bed, for example, in zones adjacent to the material under treatment, and localised downward movement of particles may occur in another zone or zones of the bed and these localised movements may vary in position and/or direction but the current must not be such as to substitute for these random or convectional or circulatory movements a uni-directional flow of particles of the whole bed.

Practical tests have shown that multi-pass fluidised bed could advantageously be used particularly for the fixing of dyes on materials, if the mechanical difficulties of operating this type of bed when processing sheet materials could be overcome. These difficulties lie in the fact that the material tends to become creased during processing and in addition is subjected to undue tensions which tend to build up in regions where the direction of movement of the material is reversed and thus be transmitted through the material, and hitherto this disadvantage has hindered the use of this type of fluidised bed, except where strong, stable sheet materials are concerned.

The main objects of the present invention are to avoid the creasing of sheet materials whilst they are being treated and to eliminate or substantially reduce the undue tension to which the more sensitive sheet materials are subjected.

According to the present invention a method of passing a material as herein defined through a multi-pass fluidised bed as herein defined includes the steps of passing the said material downwardly through the bed of fluidised particles and through an aperture in the base of the fluidised bed container into a chamber supplied with air or gas under pressure and thence upwardly from the said chamber through a second aperture into the said fluidised bed container and through the said bed, the change of direction of the said material being effected by means of a roller or rollers or by equivalent means, the said chamber, container and apertures being so arranged and the pressure of the air or gas in the chamber being such that the chamber remains substantially free from particles, the said downward and upward passage and change of direction being performed at least once.

According to a modification of the present invention a method of passing a material as herein defined through a double-pass fluidised bed as herein defined includes the steps of passing the said material downwardly through the bed of fluidised particles and through an aperture in the base of the fluidised bed container into a chamber supplied with air or gas under pressure and thence upwardly from the said chamber through a second aperture into the said fluidised bed container and through the said bed, the change of direction of the said material being effected by means of a roller or rollers or by equivalent means, the said chamber, container and apertures being so arranged and the pressure of the fluid in the chamber produces a resultant air or gas velocity which ensures that the chamber remains substantially free from particles.

According to a further feature of the present invention a double-pass or multi-pass fluidised bed comprises a container having at its base a chamber or chambers substantially isolated from the container excepting for entry and exit apertures for the material to be treated, and containing, or each containing a roller or rollers or equivalent means adapted to cause change of direction of movement of the material between entry and exit apertures and having inlets for air or gas under sufficient pressure and velocity to maintain the chamber or each chamber substantially free from particles of the bed when the bed is in a fluidised state.

Preferably the air or gas enters the chamber or chambers at positions above and below the roller or rollers or the like with sufficient velocity to prevent bed particles from entering the chamber or chambers through the material entry and exit apertures and also to fluidise the bed particles.

In one form of apparatus the upper wall of the chamber or of each chamber is formed by an arcuate plate having upwardly extending side members each adapted, over a part of its length, to define an inner wall of either an inlet or exit aperture and thereafter converging towards the other side member to define an enclosed space above the arcuate plate, said space containing an air or gas inlet pipe for fluidising air or gas and communicating through each of the inner walls by means of ports or the like with each of the adjacent apertures, the lower walls of the chamber being formed arcuately so that the said upper wall and lower walls of the chamber or of each chamber lie in proximity to a roller or rollers contained therebetween, the roller or rollers being arranged to receive material in its passage downwardly through one of the said apertures and to dispatch the material upwardly to the other or another of the said apertures, the lower walls of said chamber or of each chamber, also defining a space containing an air or gas inlet and communicating with each or a pair of the said apertures, the combination being such that when air or gas is supplied under pressure and at the requisite velocity to each of the said spaces, a bed of particles in the fluidised bed container may be fluidised and particles may be substantially prevented from entering downwardly through any of the said apertures.

Preferably the entry and the exit apertures between the container and the chamber or each chamber, are in the form of slits which may be adjustable in width to accommodate materials of various thicknesses.

In one form of apparatus the fluidised bed container may be provided with additional fluidising gas or air inlets and gas or air may be provided through these inlets and the aforesaid apertures.

The invention will be described further, by way of example, with reference to the accompanying diagrammatic illustration which represents in cross-section the lower part of a double-pass fluidised bed apparatus. In the following description reference will be made to the dyeing of a woven fabric but this is not in any way intended to restrict the use of the apparatus to the treatment of a woven fabric or to a dyeing process.

Basically the apparatus consists of a container 10 of rectangular cross section for the fluidised bed within which are two pairs of vertical rows of louvres 11. The louvres are inclined at a small angle to the vertical and converge upwardly toward the path of the woven material. The louvres of one of the columns are staggered relative to those of the other column. Between the louvres of each column cloth guides 12 are provided and these, in use, serve to ensure that material passing between the louvres of each pair of columns does not come into contact with the louvres, particularly when the material is stationary.

The louvres are hollow to enable a heating medium, for example, an electrical heating element to be used to heat the bed particles, or the louvres may be heated by steam or combustion gases.

Below the lowest hollow louvre 11 of each of the outer rows is a solid louvre 13.

Mounted below the part of the apparatus above referred to is a chamber arranged to receive a driven roller 14. The chamber is the same length as the length from end to end of the container 10 and its sides 15 have an internal configuration which closely follows the contour of the roller 14 over parts of its periphery. Between the sides 15 and below the roller 14 is a spacer 16 which serves to form the base of a substantially rectangular space which is integral with and extends downwardly from the portion of the chamber in which the roller 14 is located. Packings or gaskets 17 are provided between the sides 15 and the spacer 16. The parts just referred to are held together by bolts 18.

Within the rectangular space is an air supply pipe 19 having apertures 20 therein through which fluidising air under pressure can be passed into the chamber.

Above the roller 14 is a plate 21 which is arcuate in cross section and spaced from the roller 14 by a small distance. The plate 21 is provided with upwardly projecting sides 22 which for a short vertical distance lie parallel to and spaced from the lower vertical portion of the sidewalls 23 (hereinafter referred to) of the container 10. Over the remainder of their height the sidewalls 22 converge to meet each other above the plate 21 and above the longitudinal axis of the roller 14. The plate 21 and sidewalls 22 together define a substantially triangular space within which is located a further air supply pipe 24. Air ports 25 are provided in the plate 21 and sidewalls 22.

The sidewalls 23 of the container 10 converge in the lowermost region of the bed and for a short distance lie parallel to each other and to the sidewalls 22 so forming parallel slits extending from end to end of the bed, substantially tangential to the roller surface.

The sides 15 of the chamber are secured to the sidewalls 23 of the bed container 10 by screws 26 and to facilitate this there is provided a rebate 27 along the uppermost inner edge of each side 15 into which the corresponding sidewalls 23 are seated.

In operation, material is threaded between the two columns of louvres of a pair, from the top of the container 10, through one of the slits between one sidewall 23 of the bed and one side 22 of the plate, around the roller 14 and back through the bed, between the louvres of the other pair of colums. The roller 14 is driven from an external source of power (not shown). The roller 14 is conveniently mounted on externally located roller bearings and where it passes through the walls of the chamber is sealed by the use of, for example, carbon seals.

The bed is fluidised by the passage of air into the bed container in such a manner that the fluidisation conditions are balanced, that is to say there is substantially the same amount of fluidisation in any particular cross-section of the bed. When the bed is fluidised in the above manner it is found that for all practical purposes no bed particles fall below the level indicated by the line X—X and thus the roller 14 is not in contact with the particles.

With the apparatus above described it has been found that very low tensions are achieved. In a test run of the apparatus, a fabric, made from filaments known by the registered trade mark "Terylene," thirty six inches wide and weighing approximately two ounces/square yard was passed through the fluidised bed at a speed of six yards/minute. The running tension in the fabric was found to be four pounds weight.

Heat is supplied to the bed particles, from the electrical heating elements located inside the louvres and of course, the bed is fluidised by air which passes from the chamber through the apertures and into the bed.

The invention is not restricted to the above details. For example, apertures may be provided in the sides 22 at positions adjacent to the point at which they meet thereby to increase the fluidity of the bed particles between the two passes of material. Additionally fluidising gas inlets may be provided within the lower region of the containers 10.

The slits are preferably one-tenth of an inch wide but this width does not appear to be critical and in fact the sidewalls 23 may be movable within narrow limits to adjust the width of slits.

One of the principal advantages of the apparatus above described lies in the fact that materials having dye liquor upon them can relatively easily be passed through the bed without disturbing the dye-stuff.

In addition to dyeing the apparatus may be used for the heat treatment of wet, dry or impregnated materials and for a resin baking process.

In a further modification the apparatus above described may be modified by the inclusion therein of stentering means.

In yet a further modification a plurality of parallel spaced apart rollers may be provided in the chamber so that the material may be moved upwardly and downwardly through the fluidised bed several times in succession. In such a modification rollers would be provided above the level of the top of the bed particles to reverse the direction of travel of the material and allow for its re-entry into the bed. The arrangement would be such that the material entered and left the fluidised bed from above the bed particles regardless of the number of times it passed through the bed. Alternatively each of the lower rollers may be located in a separate chamber.

In a practical arrangement of the apparatus it is necessary to be able to control the speed of passage of the material through the bed, the amount of heat supplied to the bed, and the amount of fluidisation.

The speed of the material through the bed is mechanically controlled by means of a take-up roller (this speed will vary, for example, according to the material and the dyestuff applied). In the case of dyeing the speed of the dye padding rollers will be matched to the speed of the take-up roller, allowance being made for shrinkage of the material during treatment. The mechanical arrangement is such as to enable the material tension to be measured by means of a compensating rise-and-fall roller suitably weighted. Control is thus achieved by adjusting the take-up speed and the speed or roller 14. The latter roller usually runs at a speed slightly in excess of the material which is passed around it.

The heat supplied is controlled by wiring the electrical heaters of the louvres 11 in three banks (of 16 kw. each) and controlling each bank by means of thermostats immersed in the bed. Each thermostat can be individually set and actual bed temperature is measured by thermocouples distributed throughout the bed.

The amount of fluidisation is not critical but is usually controlled. In a bed six inches wide and forty-eight inches long the inflow of air is between 275 and 350 cubic feet per minute (at a pressure of approximately 7 lbs./square inch gauge) when using bed particles 0.5 mm. in diameter.

I claim:

1. A multi-pass fluidised bed apparatus for heat treating elongated flexible material, comprising a container, a bed of solid discrete particles in said container adapted to be fluidised by an upward gaseous current, a chamber below said container and substantially isolated from the latter, said chamber and container communicating through two spaced apart apertures, each aperture being just wide enough to permit the free passage through it of the material being treated, a roller within said chamber for changing the direction of movement of the material which passes through said apertures and is trained about said roller, means for providing gas, under a pressure greater than that existing in said container and sufficient to fluidise said bed, to said chamber on both sides of the material, and the bottom wall of said container being formed with two pairs of downwardly converging walls and each of said apertures being defined by a pair of opposed walls, each pair of converging walls merging at their lower ends with one pair of said aperture-defining walls, whereby the pressurized gas in said chamber passing upwardly through said apertures will enter said chamber and expand without producing a uni-directional stream of said fluidised particles.

2. A multi-pass fluidised bed apparatus as defined in claim 1 wherein one wall of each pair of aperture-defining walls is mounted for movement toward and away from the other, and including means for effecting such movement in order to vary the width of said apertures so that they may accommodate materials of various thicknesses.

3. A multi-pass fluidised bed apparatus as defined in claim 1 wherein the inner walls of each of said pairs of container walls converge upwardly and meet to define a space above said roller, the lower wall of said chamber is formed with a space below said roller, and said gas-providing means includes a pipe located in said space above said roller for providing gas to said chamber, and another pipe located in said space below said roller for providing gas to said chamber.

4. A multi-pass fluidised bed apparatus as defined in claim 3 wherein said space above said roller is provided with an arcuate bottom wall extending between the inner walls of said aperture-defining walls, the curvature of said bottom wall conforming to the curvature of said roller so that it lies in proximity to the roller throughout its length, and an aperture in said arcuate wall through which pressurized air flows from said space above said roller into the space between said arcuate wall and said roller.

References Cited in the file of this patent

UNITED STATES PATENTS

| | | |
|---|---|---|
| 2,785,478 | Audas | Mar. 19, 1957 |
| 2,901,312 | Audas | Aug. 25, 1959 |
| 2,938,276 | Doleman | May 31, 1960 |
| 2,964,852 | Doleman | Dec. 20, 1960 |
| 3,014,777 | Chipalkatti et al. | Dec. 26, 1961 |

FOREIGN PATENTS

| | | |
|---|---|---|
| 1,026,942 | France | Feb. 11, 1953 |

OTHER REFERENCES

"Letters to the Editor," Journal of Sci. Industrial Res., page 541, vol. 14B, 1955.